UNITED STATES PATENT OFFICE.

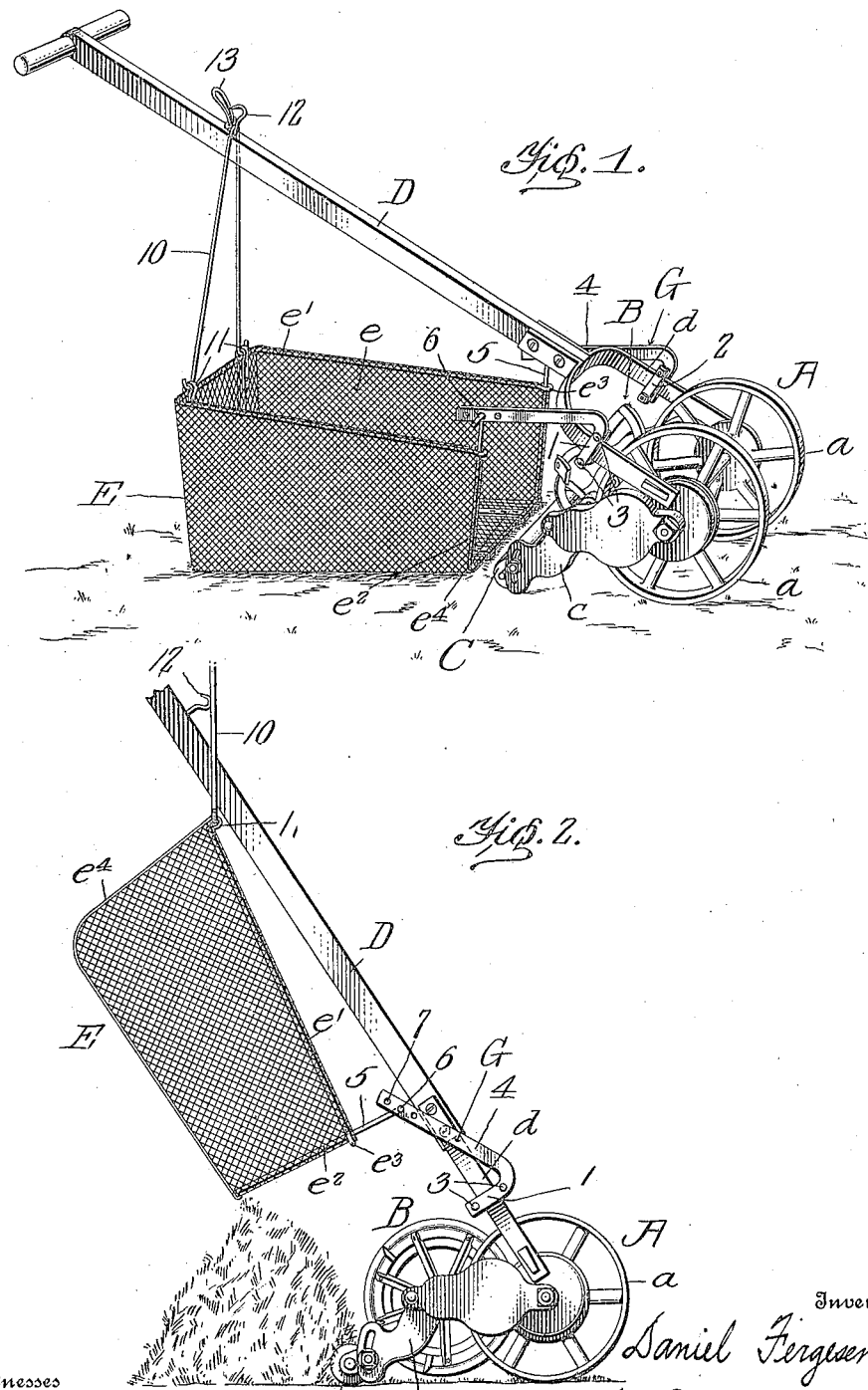

DANIEL FERGESEN, OF AURORA, ILLINOIS.

GRASS-CATCHER FOR LAWN-MOWERS.

No. 875,056.

Specification of Letters Patent.

Patented Dec. 31, 1907.

Application filed July 10, 1906. Serial No. 325,555.

*To all whom it may concern:*

Be it known that I, DANIEL FERGESEN, a citizen of the United States, residing at Aurora, in the county of Kane and State of Illinois, have invented new and useful Improvements in Grass-Catchers for Lawn-Mowers, of which the following is a specification.

This invention relates to certain improvements in grass-catching attachments to lawn mowers and consists in certain peculiarities in the construction and arrangement of parts and in certain novel combinations of elements substantially as hereinafter described and particularly pointed out in the subjoined claims.

The object of the device is to provide a grass catching means of most simple, inexpensive and durable construction, and one which may be quickly applied to the handle of any ordinary lawn mower, may be set at varying distances from the cutters of the mower, and may be instantaneously dumped without stopping the operation of the mower and in dumping will not be liable to drop the grass upon the mower and into the cutting mechanism and gearing thereof. These several ends are well accomplished by the construction illustrated in the accompanying drawings, in which Figure 1 is a perspective view of a lawn mower provided with my grass-catching attachment thereto, showing the latter in position to receive the grass: and Fig. 2 is a side elevation of the same, showing the catcher in the position in which it dumps its contents.

The same characters of reference designate the same parts in both figures.

A represents a lawn mower of any ordinary or suitable construction, mounted on the supporting wheels $a$ and having any suitable cutting mechanism, indicated generally at B, and any suitable gearing for driving the cutters; and also having a rear supporting roller C journaled in a frame $c$. The mower is further provided with an ordinary propelling handle D, the front end of which is connected with it by a handle bail or yoke $d$. This bail or yoke may, if desired, be so connected to the mower as to provide for a limited pivotal play, as usual.

Suspended from the handle D is a grass receiver E, and this grass receiver is connected with the handle by means which constitute the essence of the present invention. The body $e$ of the grass receiver is preferably made of a single piece of wire mesh and its frame preferably comprises an upper horizontal U-shaped piece $e'$ of heavy wire, over which the upper edge of the mesh is folded and suitably secured. At the front of the receiver, which is left open for the dumping of its contents, there is a vertically arranged U-shaped piece of heavy wire, which constitutes a second frame-member, $e^2$, and this second frame member is preferably connected with the first-mentioned one by extending the upper ends of its vertical limbs through eyes $e^3$ formed at the ends of the first member. The front edge of the body is connected with this second frame member $e^2$ by being folded around the same and secured. The construction is completed by providing the body with stiffening straps $e^4$, which extend along the bottom and up the rear side of the body, are bent over the horizontal limbs of the front and upper frame members and have their ends riveted to their body. The bottom of the receiver, at the front, is preferably slightly bent upward to hold the grass in the receiver when the latter is in receiving position. Such a construction of receiver possesses in a maximum degree the important requisites of lightness, inexpensiveness and durability and, therefore, is greatly preferred. The means shown in the drawings for suspending this receiver from the handle, comprise a fixed supporting means with which the front end of the receiver is pivotally connected and a movable supporting means for the rear end of the receiver, adapted to be operated to turn the same. The former supporting means, preferably comprise a pair of hangers G which are L-shaped, or approximately so. One arm or member, 1, of each of these hangers, constitutes, in connection with a strap 2, a clamp for securing the hanger fixedly and adjustably to the adjacent arm of the bail $d$. The arms or members 1 and 2 are arranged on opposite sides of said bail-arm and are clamped thereto by bolts 3, which, when loosened, permit the hanger to be adjusted longitudinally on the bail-arm. The other arm or member 4 of each hanger extends rearward from the first-mentioned arm or member and constitutes one element by which the clamp is connected with the receiver.

The connection just referred to is a pivotal one, and is very conveniently provided by extending upward the vertical limbs of the frame-members $e^2$, so as to form pivoting arms 5 which extend above the front end of the receiver. The extremities of these arms are bent laterally, as shown at 6, and are adaptable to enter apertures 7 near the free ends of the hanger-members 4. A series of such apertures 7 are shown in each arm or member 4. The arms 5 are sufficiently resilient to enable them to be sprung to free their ends 6 from the apertures in which they are engaged, and to cause them to spring, when released, into engagement with apertures opposite to which they have been moved.

From the foregoing it will be seen that a maximum range of adjustment of the front end of the receiver upon the handle and with relation to the operating mechanism of the lawn mower and the ground, is provided, adjustment being not only provided by the movability of the hanger or its clamp on the handle-bail, but there is also provided a second and additional adjustment of the receiver longitudinally upon the hanger. The advantage of this will be apparent. Moreover, it will be observed that the hanger members 4 extend well back from the mower and to a place rearward of the operating parts thereof and that the pivotal connection of the upper forward end of the receiver therewith permits the receiver to be swung, upon the ends 6 as centers, until its movement is stopped by its upper rear end coming in contact with the underside of the handle D. In this movement of the receiver its open forward end swings rearward and as its connection with the hanger is or may be rearward of the operating parts of the mower, it will be apparent that the grass will be dumped at the rear of the operating mechanism of the mower and not upon the same. The liability of the cut grass to clog the mechanism of the mower or to catch upon the blades of the cutter is, therefore, obviated.

The pivotal movement of the receiver is accomplished by lifting its rear end. This may be most conveniently done by providing the rear end with a device which serves at once as a means operable to turn the receiver independently of the handle D and also as a means for suspending the rear end of the receiver from said handle. The one shown and preferred consists of a yoke shaped handle 10 the ends of which are secured to the upper rear end of the receiver, preferably by bending their extremities laterally and inserting them in eyes 11 with which the frame-straps $e^4$ are provided. The propelling handle D extends through this yoke and the closed end of the latter rests thereupon, so that the yoke serves, as stated, both as a handle for dumping the receiver and as a means for suspending the rear end of the receiver from the handle. A stop is provided for preventing accidental displacement of the yoke on the handle. This stop is preferably composed of a screw hook 12 which may be adjusted upon the handle to cause the rear end of the receiver to be supported at different predetermined distances from the ground. The upper end of the handle or yoke 10 preferably terminates in a loop 13 for convenience in raising the receiver.

From the foregoing, the construction, operation and advantages of the device will be apparent, it being particularly notable that while it is of simple, light, inexpensive and durable construction, it may be quickly applied to and removed from the mower, and adjusted to suit varying requirements, and that the receiver may be dumped without lifting the mower or even stopping the operation of the mower, and in dumping will discharge the grass entirely rearward of the cutting mechanism of the mower.

It should be noted that the receiver is dumped primarily by lifting the handle or yoke 10 thus raising the rear end of the receiver to the mower handle D, and that if this is not otherwise sufficient to cause the grass to be dumped where desired, the mower handle may be raised slightly out of the way of the receiver, without however necessitating that the mower be lifted from the ground. The play provided for at the connection of the handle D with the mower, in lawn mowers as usually constructed, is sufficient to afford the limited range of movement of the handle D with the receiver which may in some cases be necessary to secure efficient dumping at the place desired. It should be further noted that in order to detach the receiver from the mower it is necessary only to press the pivoting arms 5 so as to free their laterally bent extremities 6 from the apertures 7. The handle 10 may be turned pivotally to the rear, over the end of the mower handle D. The receiver in this most simple and convenient manner is feed from the mower and, if filled with grass, may be dumped by hand into a cart or box, or it may be laid away if its immediate use is not desired.

Having thus described the invention what I believe to be new and desire to secure by Letters Patent, is:—

1. A lawn mower having a handle with a bail, and a grass catcher having hangers, arranged rearward of the operating mechanism of the mower and each comprising a plurality of arms arranged at an angle with each other, one of said arms extending rearwardly; means for securing the hangers to the handle bail, a receiver having supporting means extending from its forward upper end and pivotally connected with the rearwardly-extending arm of each hanger, said receiver being free to turn pivotally relatively to the hangers and mower, and means for turning the receiver on its pivots, whereby its contents are dumped clear of the operating mechanism of the mower.

2. A lawn mower, having a handle with a bail, and a grass catcher having hangers, arranged rearward of the operating mechanism of the mower and each comprising two arms arranged at an angle with each other, one of said arms extending rearwardly and the other extending downward from the forward end thereof and secured to the handle bail; a receiver having supporting means which extend above its top, at its forward end, and are pivotally attached at their upper ends to the rearwardly extending arms of the hangers, and a supporting means for the rear end of the receiver, adapted to suspend the rear end of the same from the handle and to move relatively to the handle and turn the receiver on the pivots connecting it with the hangers.

3. A grass catcher for a lawn mower, comprising a receiver having an open forward end and means adapted to support the same from the propelling handle of the mower, said means including a hanger having means at one end for attaching it to the handle-bail of the mower and an arm extending rearward from the attaching means, a pivoting means extending from the receiver and connected, above the top of the latter, with said arm of the hanger at a place which is rearward of the attaching means, and a suspending and elevating means for the rear end of the receiver adapted to be supported from the mower-handle and when moved to turn the receiver about its pivotal connection with the hanger and thereby cause the contents of the receiver to be dumped through said open forward end.

4. A grass catcher for a lawn mower, comprising a receiver having an open forward end, and means adapted to support the same from the propelling handle of the mower, said means including a plurality of hangers, each of which comprises two arms extending at an angle with each other, one of said arms provided with means for attaching the hanger to the mower and the other extending rearward therefrom, pivoting means connecting the upper forward end of the receiver with each of said rearwardly extending arms at a place rearward of said attaching means, and a suspending and elevating means for the rear end of the receiver, adapted to be supported from the mower handle.

5. A grass catcher for a lawn mower, comprising approximately L-shaped hangers, a plate and securing means adapted to coöperate with the forward member of each of said hangers to clamp the arms adjustably to the handle-bail of the mower, a receiver having means extending from its forward upper end and pivotally connected with the rear ends of the other members of the hangers, and means for movably suspending the rear end of the receiver from the handle.

6. In combination with a lawn mower, having a handle with a bail; a grass receiver provided at its forward end with upwardly projecting arms; hangers having means for adjustably fixing their forward ends to the handle-bail of the mower, said hangers extending rearward from the place of their attachment to the bail and said arms being pivotally connected therewith above the top of the receiver and rearward of said place of attachment, and means adapted to suspend the rear end of the receiver from the mower-handle, and to be moved relatively to the latter to turn the receiver pivotally upon the hangers.

7. In combination with a grass receiver adapted to a lawn mower and comprising a frame having an open front and provided at said front with an approximately U-shaped member: hangers to the rear ends of which the upper ends of said member are pivotally connected, said hangers extending forward from the receiver and provided with means for securing them to the handle-bail of the mower, and means for suspending the rear end of the receiver from the mower-handle, adapted to be moved relatively to said handle and to turn the receiver pivotally relatively to the hangers.

8. A grass catcher for a lawn mower, comprising approximately L-shaped hangers having means adapted to secure their forward ends to the handle-bail of the mower, a receiver having an open front end provided with an approximately U-shaped frame member which projects above the body of the receiver and has its ends pivotally connected to the rear ends of the hangers, and means for suspending the rear end of the receiver from the mower handle, adapted to be moved relatively to the latter and to turn the receiver pivotally relatively to the hangers.

In testimony whereof I affix my signature, in presence of two subscribing witnesses.

DANIEL FERGESEN.

Witnesses:
LILLIAN C. WOODRUFF,
CHAS. M. COATS.